Aug. 2, 1938.   R. J. ROTE ET AL   2,125,814
STEAM HEATED CORE FOR MOLDING BATTERY CONTAINERS
Filed April 20, 1936   2 Sheets-Sheet 1

ROBERT J. ROTE.
SIDNEY W. BRITTON INVENTORS.

BY Merrill M. Blackburn
ATTORNEY.

ROBERT J. ROTE
SIDNEY W. BRITTON INVENTORS.

BY
Merrill M. Blackburn
ATTORNEY.

Patented Aug. 2, 1938

2,125,814

UNITED STATES PATENT OFFICE 2,125,814

STEAM HEATED CORE FOR MOLDING BATTERY CONTAINERS

Robert J. Rote and Sidney W. Britton, Rock Island, Ill.

Application April 20, 1936, Serial No. 75,400

1 Claim. (Cl. 18—19)

The present invention relates to the art of molding plastics which are to be cured by heat and more particularly to the art of molding battery containers, although the invention is not limited to that use, nor is it limited to the molding of rubber articles.

Among the objects of this invention are to provide an improved apparatus for the molding of plastic articles; to provide an apparatus which, although heated by steam under pressure, will, nevertheless, prevent leakage of the steam between the connected parts of the core; to provide a method of holding the blocks of a core of the character indicated in such close relationship as to prevent leakage between them; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Figure 2:
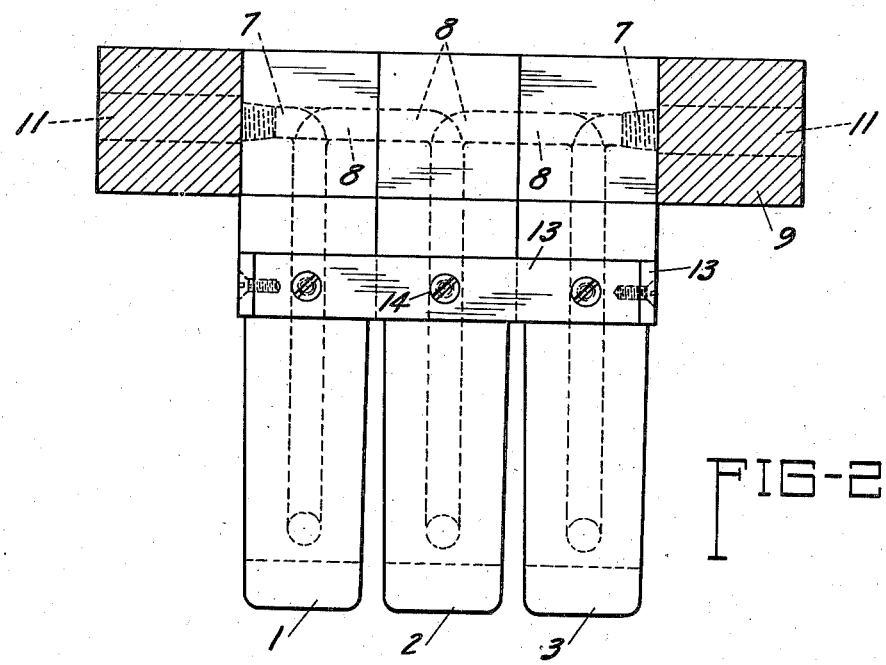
Fig. 2 represents a sectional elevation taken substantially along the plane indicated by the line 2—2, Fig. 1.
Figure 3:
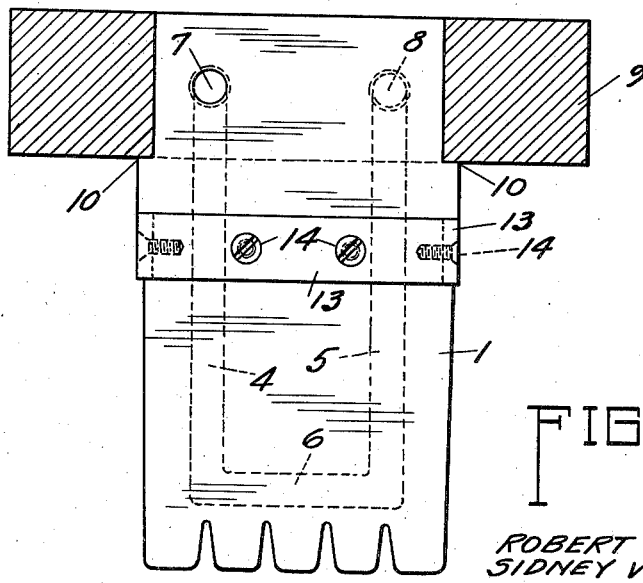
Fig. 3 represents a sectional elevation taken substantially along the plane indicated by the line 3—3, Fig. 1.

Reference will now be made in greater detail to the annexed drawings for a more complete disclosure of this invention. In fabricating this core, a plurality of blocks 1, 2, and 3 are provided with longitudinal openings 4 and 5 connected by transverse openings 6. These openings may be formed in any desired way but we regard it preferable to drill holes into the blocks and then plug the entrance ends of these holes, when they are no longer needed. For example, the holes 4 and 5 may be formed by drilling through from what is represented in Figs. 2 and 3 as the top ends nearly to the bottom ends of the blocks. The holes 6 may be formed by drilling transversely in the blocks from one lateral edge thereof, and then the external ends of these openings, no longer needed, may be plugged up to prevent the escape of steam from the openings when steam is permitted to enter them and the needed pressure is applied to the steam.

The ends of the openings 4 and 5, represented in Figs. 2 and 3 as the upper ends, may be connected to opposite lateral faces of a block by cross-holes 7 and 8 drilled into the block to intersect the holes 4 and 5. The holes 7 are threaded for the attachment of an ordinary threaded pipe, but the holes 8 are left unthreaded.

Figure 1:
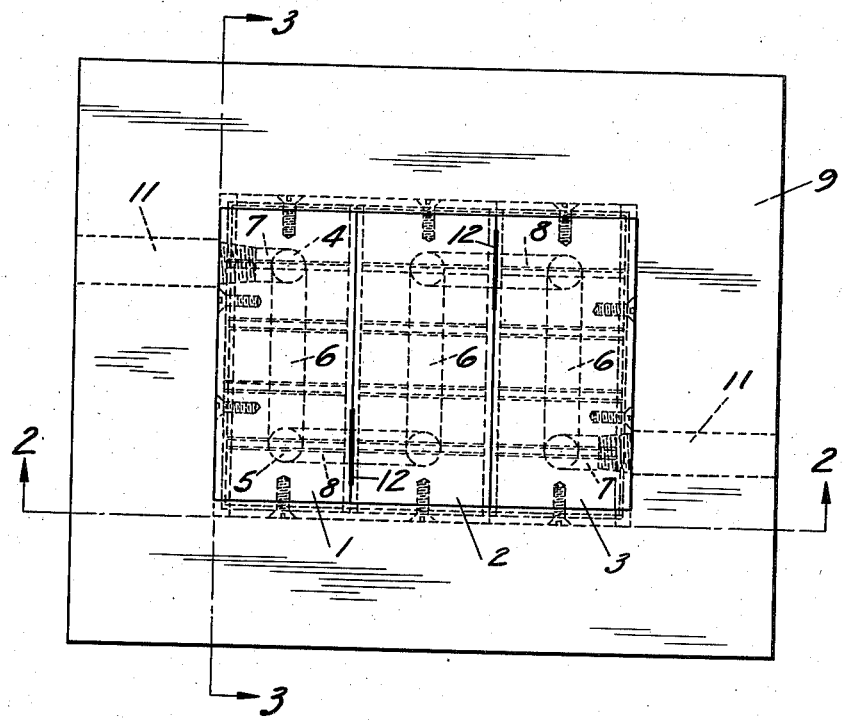
Fig. 1 represents a plan of a structure built in accordance with the present invention.

A rectangular block 9 has an opening formed in the center thereof for the reception of the ends of the blocks 1, 2, and 3, secured together in close relationship as a unit. The blocks are provided with shoulders 10 upon which the hollow block or ring 9 rests, with its opposite face just flush with the ends of the blocks. This arrangement is not essential but is regarded as preferable. It is believed preferable to heat the ring 9 and expand it and then put it around the ends of the blocks 1, 2, and 3 in expanded condition. Then when the ring cools off to the same temperature as the blocks, it will be held in such tight relationship thereto as to be practically not removable therefrom except by destruction of the ring, as by cutting through same in one or more places. In order to permit pipes to be inserted into the openings 7 and screwed therein, after the ring 9 has been attached to the blocks 1, 2, and 3, openings 11 are formed through the ring 9 in alignment with the openings 7, thus rendering it possible to insert the pipes and screw them into the openings 7. In this way, tight connections may be formed between the steam-carrying pipes and the blocks 1, 2, and 3 so as to prevent leakage of steam between the pipes and the blocks. In order to prevent leakage between the blocks, a suitable sealing medium is applied around the holes 8, as shown at 12, in Fig. 1, and then the blocks are brought together and secured in place by having the ring 9 applied thereto, as described above. This sealing medium 12 is shown very much exaggerated in the drawings.

Strips of hardened steel 13 are secured in place in grooves in the blocks 1, 2, and 3, as by screws 14. These strips are useful in the molding of battery containers since they serve to form a sealing ledge or cover support for the container. They are made hard in order to prevent scoring when the strips enter the space between the side plates as the core is completing the formation of the container.

The grooves between the blocks for forming the separating walls between the different cells of the battery, and also the grooves for forming the separator supports, are well known in the art and further reference will therefore not be made thereto.

It is obvious from an examination of the drawings that the openings in the blocks, taken together, constitute a continuous channel through which the steam may flow and that the steam passing through this channel, under a suitable pressure and temperature, will heat the core to a proper temperature to cause curing of the plastic. It is noted that the channels in the different blocks are connected in series but that it is possible also to connect them in parallel by drilling the inlet and outlet openings in the proper directions and then connecting proper delivery and exit pipes through the channels. It is regarded that this comes within the scope of this invention.

It will of course be understood that the specific description of structure set forth above may be departed from without departing from the spirit of this invention as set forth herein and in the appended claim.

Having now described our invention, we claim:

A core for molding plastic articles to be cured by heat, comprising a plurality of shaping blocks having approximately parallel openings extending through a major portion of one dimension thereof, having an opening in each block connecting a pair of adjacent ends of the approximately parallel openings in that block, and each of said blocks having other openings at one end thereof extending transversely to the first mentioned openings to mate with other like openings in adjacent blocks, said blocks being arranged in side-by-side relation with said ends in contact with each other and with the mating openings forming continuous channels between the blocks, and a holding frame tightly shrunk around said ends of said blocks to hold them pressed intimately together so as to prevent leakage between the blocks.

ROBERT J. ROTE.
SIDNEY W. BRITTON.